United States Patent [19]
Meier

[11] Patent Number: 5,774,381
[45] Date of Patent: Jun. 30, 1998

[54] MODELING AND SIMULATION OF CATALYTIC CRACKING

[76] Inventor: Paul F. Meier, 1100 Cherokee, Bartlesville, Okla. 74003

[21] Appl. No.: 845,971

[22] Filed: Mar. 4, 1992

[51] Int. Cl.⁶ .................................................. G06F 17/00
[52] U.S. Cl. .......................................................... 364/578
[58] Field of Search ................... 364/500, 501, 364/502, 578; 395/906

[56] References Cited

U.S. PATENT DOCUMENTS

| | | | |
|---|---|---|---|
| 3,175,968 | 3/1965 | Berger | 208/164 |
| 3,564,221 | 2/1971 | "Robert F." | 364/500 |
| 3,725,653 | 4/1973 | Carr et al. | 364/500 X |
| 3,728,085 | 4/1973 | Horiguchi et al. | 364/500 X |
| 3,828,171 | 8/1974 | Griffin | 364/501 |
| 3,960,707 | 6/1976 | Gross et al. | 364/501 X |
| 4,187,548 | 2/1980 | Gross et al. | 364/578 |
| 4,217,243 | 8/1980 | Christie | 364/500 X |
| 4,243,630 | 1/1981 | Kliesch et al. | 364/501 X |
| 4,332,590 | 6/1982 | Smith | 364/500 X |
| 4,349,869 | 9/1982 | Prett et al. | 364/500 X |
| 4,358,822 | 11/1982 | Sanchez | 364/501 X |
| 4,437,977 | 3/1984 | Funk | 208/113 |
| 4,616,308 | 10/1986 | Morshedi et al. | 364/500 X |
| 4,736,316 | 4/1988 | Wallman | 364/501 X |
| 5,132,918 | 7/1992 | Funk | 364/501 |

OTHER PUBLICATIONS

Weekman, Jr.; "A Model of Catalytic Cracking Conversion in Fixed, Moving, and Fluid Bed Reactors"; I & EC Process Design and Development, vol. 7, No. 1 (1968); pp. 90–95.

*Primary Examiner*—Ellis B. Ramirez
*Attorney, Agent, or Firm*—George E. Bogatie

[57] ABSTRACT

A kinetic model for a catalytic cracking riser reactor is stored in a computer for simulating a hydrocarbon cracking reaction. The stored model describes a reactants, an intermediate, and a product species, which are lumped according to boiling range. Reaction rate constants for cracking the individual components of the lumping scheme are functions of a statistical technique known as "principal components," which are in turn linear combinations of bulk properties characterizing both catalyst and oil and are based on historical operating data for the riser reaction.

15 Claims, 8 Drawing Sheets

MODELING AND SIMULATION OF CATALYTIC CRACKING

This invention relates to refining of crude oil. In one aspect it relates to a method and an apparatus for computer simulation of catalytic cracking of crude oil. More specifically, it relates to defining a mathematical model based on chemical kinetics of catalytic cracking reactions, and use of the model in computer simulation for the cracking of crude oil carried out in a riser reactor.

BACKGROUND OF THE INVENTION

As refiners increase the proportion of heavier, poorer quality crude oil in the feedstock to be processed, the need grows for improved processes to refine heavy residual fractions of petroleum. In many refineries heavy residual oil resulting from distillation of sour crude oil, or so called topped crude or simply resid, is pretreated in a hydrotreating process before sending the resid product to a fluidic catalytic cracking (FCC) process step. As used herein a "heavy oil" is taken to mean a hydrocarbon liquid boiling at atmospheric pressure in a range of from about 650° F. to as high as 1300° F., and which contains a variety of very complex chemical compounds.

A principal factor which affects the economic viability of a fluidic catalytic cracking unit is the amount of the feedstock which is converted to a desired product such as gasoline. In many refineries, the feed to an FCC unit typically consists of a heavy oil containing an unlimited mixture of complex molecules of straight and branched paraffins, cycloparaffins, and aromatics ranging from monoaromatics to four or five rings with a vast variety of side chains. It is generally very difficult to maintain a desired conversion of this heavy oil feedstock in an FCC unit.

In recent years the use of computers has increased greatly as a means to examine complex chemical reactions by simulation techniques. Digital computer simulation is particularly valuable in many areas relating to refining of heavy oil such as predicting what a cracking reactor will do under different conditions, advanced control techniques, and perhaps most importantly catalyst evaluation.

Accordingly, it is an object of this invention to provide a "tool" to aid in understanding the chemical kinetics of cracking heavy hydrotreated resid oil.

Another object of this invention is to develop a mathematical model for a commercial size fluidic catalytic cracking reactor.

More specifically, it is an object of this invention to develop a chemical kinetic model for predicting the conversion of heavy oil to lower boiling hydrocarbon products, wherein reaction rate constants for the model are based on bulk properties characterizing both oil and catalyst.

A further object of this invention is to produce a computer program for closely simulating cracking of heavy oil in a riser reactor in gas phase plug flow conditions so as to provide guidance for refineries for improving commercial operation.

SUMMARY OF THE INVENTION

In accordance with the present invention there is provided a method and apparatus for modeling and simulating a catalytic cracking reaction for the conversion of a heavy oil feed stream, wherein the heavy hydrocarbon components are contacted with a freshly regenerated cracking catalyst in a riser reactor maintained under catalytic cracking conversion conditions to produce hydrocarbon components of lower molecular weight.

A mathematical model for predicting conversion and yields of cracked products of a feed stream containing a multiciplicity of hydrocarbons describes the conversion process by first lumping hydrocarbons according to boiling range into a plurality of lumped species representing: (1) a reactants lump, (2) an intermediate component lump and (3) at least one final product lump; then defining a conversion reaction network for the lumped species with reaction paths in the network flowing from heavier to lighter components; then constructing a chemical kinetic cracking equation, which expresses the rate of reaction in terms of concentration of reactant and product lumps and also integrates catalyst decay with the kinetics for each step in the reaction network; and finally determining reaction rate constants for the kinetic model, wherein the assigned reaction rate constants are based on measured bulk properties of both catalyst and oil obtained from historical operating data of a reactor.

In a preferred embodiment, a known statistical technique called "principal component analysis" is employed to establish a genuine mathematical relationship for making reaction rate constants a function of eight selected oil and catalyst properties. Using this technique, rate constants for the individual lumps are a function of principal components which are in turn linear combinations of bulk properties characterizing both oil and catalyst. In this preferred embodiment coefficients for eight principal components (PC) are statistically computed based on a historical data set of eight properties (PROP) which characterize the oil and catalyst and where correlated oil or catalyst properties (e.g. API gravity and sulfur content) may be selected to characterize the oil or catalyst. To determine reaction rate constants for the model at a reference temperature, each principal component is expressed as a unique linear combination of the eight selected properties, with each property multiplied by a coefficient according to the principal component analysis. For example, the first Principal Component is expressed as:

$$PC_1 = A(PROP_1) + \ldots + H(PROP_8)$$

where coefficients A etc. are known from the principal component analysis and $(PROP_1)$ etc. are historical measured values of the eight selected oil/catalyst properties. Next each reaction rate constant (RR) is expressed as a function of the eight principal components. For example, the first reaction rate constant is expressed as:

$$RR_1 = C_0(1 + C_1 PC_1 + \ldots + C_8 PC_8)$$

A statistical regression analysis then determines values for the coefficients $C_0$–$C_8$ of the principal components, which substantially fit historical conversion and yield data of a commercial reactor to the prediction of the kinetic equations.

The simulation includes a programmable means comprising a programmable computer for storing the kinetic process model along with predetermined coefficients for multiplying each property which is used in the equation for the principal components and predetermined coefficients for multiplying principal components which are used in the equation for reaction rate constants. Input data for the programmable computer include oil properties of the fresh feed, recycle through-put ratio, equilibrium catalyst properties, space velocity, catalyst residence time and reactor temperature. The computer simulation sequentially calculates the principal components, the reaction rate constants at riser temperature, the fractional conversion of the feed, and yields of lower molecular weight products. The results of the simulated reaction, which includes hydrocarbon conversion achieved and yields of cracked products, may be presented as printed numerical computer outputs, or presented as computer generated graphic displays.

DETAILED DESCRIPTION OF THE PREFERRED EMBODIMENT

Figure 1:
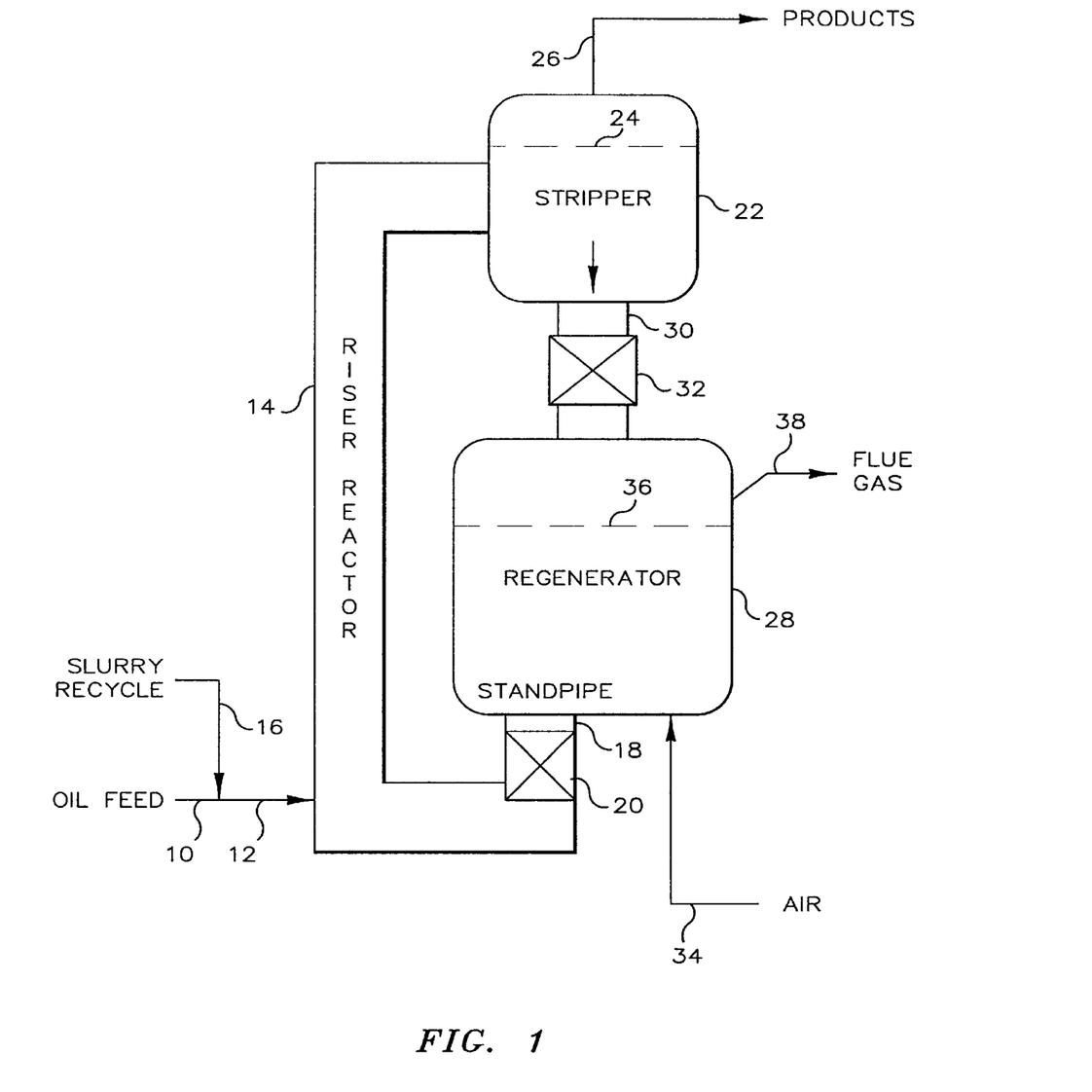
FIG. 1 is a schematic illustration of the catalyst section of a stacked configuration of a typical FCC unit employing a riser reactor.

Fluidized catalytic cracking processes employ catalyst in the form of very fine particles which behave as fluids when aerated with a vapor. Since the cracking process produces coke which remains on the catalyst particles and rapidly lowers its activity, the fluidized catalyst is circulated continuously between a reaction zone and a regeneration zone. In addition to facilitating regeneration of the catalyst, the catalyst circulation acts as a vehicle to transfer heat from the regenerator to the oil feed. A basic fluidized reactor configuration is a stacked arrangement as shown in FIG. 1. In this configuration, the reaction occurs in a riser reactor with control of the reaction being maintained by varying the catalyst circulation rate.

Referring now to the drawings and in particular to FIG. 1, which illustrates the catalyst circulation section of an FCC unit, a heavy oil feed is supplied through the combination of conduits 10 and 12 to the riser reactor 14. The reactor feed can include a slurry recycle oil stream from a fractionator (not shown) associated with the catalyst circulation section via conduit 16. A zeolite cracking catalyst is generally preferred, but any suitable cracking catalyst may be utilized. Heated regenerated catalyst from a standpipe 18, having a slide valve 20, is combined with the feed oil in the riser reactor 14 such that a catalyst hydrocarbon mixture rises in reactor 14, where the major portion of the cracking reaction occurs in the presence of freshly regenerated catalyst and at suitable temperatures. The catalyst/hydrocarbon mixture is passed from the riser reactor 14 to a stripper 22 where fine catalyst particles are separated from the hydrocarbon vapor. In the stripper 22, there may be further contact between hydrocarbon vapor and active cracking catalyst within a relatively dense catalyst bed illustrated below the dash line 24. The reaction products are withdrawn overhead from stripper 22 via conduit 26 and transferred to a product recovery section which includes at least one fractionator (not shown).

A stream of spent or coked catalyst is continuously passed from stripper 22 to a regenerator 28 via transfer conduit 30 having a slide valve 32. Carbon is burned off the spent catalyst in regenerator 28 in the presence of air introduced to the regenerator via conduit 34 to produce a fresh catalyst which is combined with the hydrocarbon feed. In the lower portion of regenerator 28, a relatively densed fluidized bed represented as below dash line 36 provides for contact between the catalyst particles and the oxidizing air stream supplied via conduit 34. Hot flue gas is removed from the regenerator 28 via conduit 38 for heat recovery or other suitable use (not illustrated). Average reactor temperatures are in a range of about 950° to 1000° F. with feed oil temperature from about 150° to about 500° F. and regenerator exit temperature for catalyst from about 1250° to about 1320° F.

Development of Reaction Model

In accordance with one aspect of this invention, there is provided a mathematical model for predicting conversion of heavy oil feeds and yields of cracked hydrocarbon products for an FCC operation such as shown in FIG. 1. The model is based on a network of simultaneous and consecutive reaction of lumped hydrocarbon components illustrated in FIG. 2. As used herein, a lump is a selected hydrocarbon boiling point range or a selected species in the reaction network, which can be represented by a kinetic expression. The lumping scheme groups kinetically similar molecules or components for describing an overall conversion in a simplified reaction network which is adequate to predict the major process yields in the cracking of different charge stocks under a range of process conditions.

Figure 2:
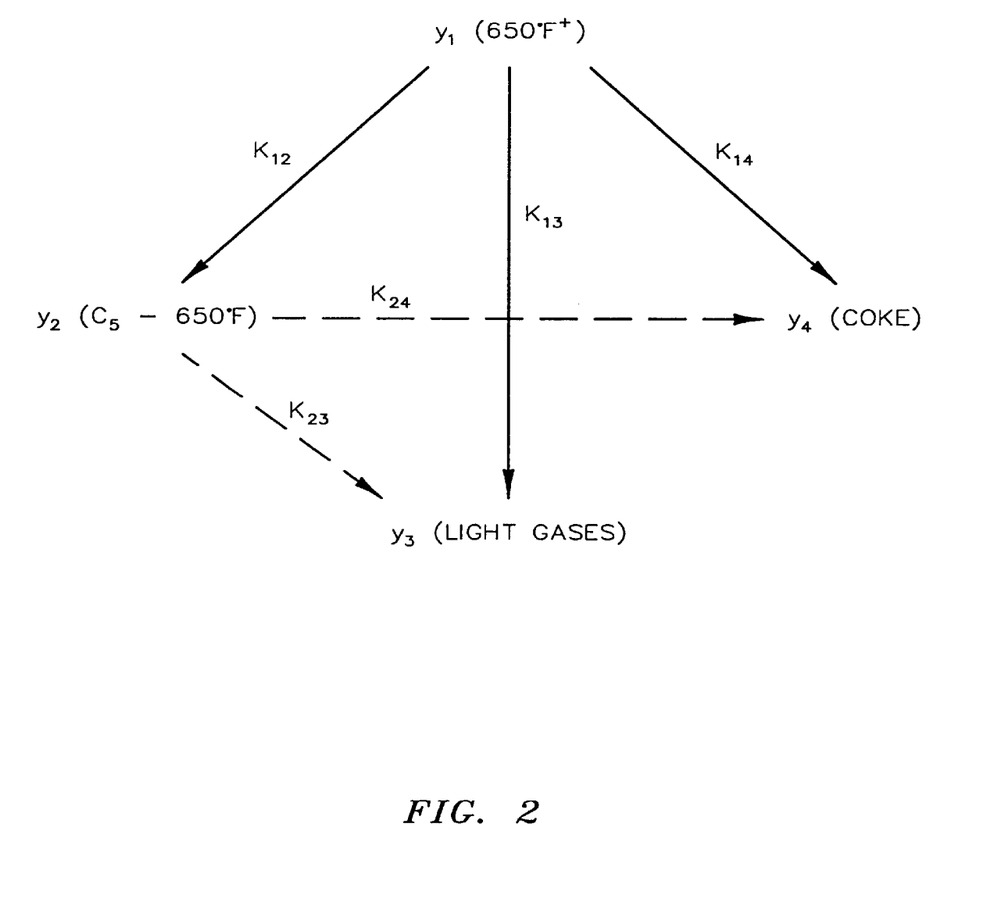
FIG. 2 illustrates the paths of the chemical kinetics for a four lump conversion reaction scheme.

Referring now to FIG. 2, there is illustrated the reaction network chosen for modeling heavy oil cracking and the reaction rate assigned to the various steps. Since these reaction rates decay rapidly as coke is laid down on the catalyst, it is necessary to integrate catalyst decay with the kinetics to achieve a satisfactory mathematical model. Further in accordance with this invention, each reaction rate is an expressed function of the feed and catalyst properties taken from actual historical plant data. Still further, with reaction rates dependent on catalyst properties, there is a straightforward method for representing effects of changes in riser temperature using an Arrhenius type approach, as will be more fully explained hereinafter.

Lump $y_1$ illustrated in FIG. 2, includes the entire charge boiling above 650° F., and of course, contains all of the various individual chemical compounds described above. Lump $y_2$ includes gasoline and light cycle oil (LCO) as a single lump ($C_5$-650° F.) which makes the simulation more tractable since the cut point separating gasoline and LCO changes seasonably at the refinery. Lump $y_3$ combines ten light gas products. Since each light gaseous product is formed along the same reaction path, the only difference between the light gas equations for each of the light gases is the magnitude of the rate constants and their dependence on the feed and catalyst properties. Accordingly, model predictions for yield of the following light gases are provided based on the same reaction path: hydrogen, methane, ethylene, ethane, propylene, propane, isobutylene, other butenes, isobutane and normal butane. Lump $y_4$ is the coke yield which is defined using the same kinetic form as the light gas equation but further includes an additive term to account for coke formation resulting from the deposition of carbon residue. Thus, there is a total of thirteen (13) equations for the various predictions including the feed conversion, combined gasoline and LCO, coke, and ten (10) individual light gases.

Kinetic equations for irreversible cracking of hydrocarbon vapor carried out in a riser reactor of uniform cross-section under isothermal and steady state plug-flow conditions are given by equations (1)–(4) below. The term "Phi" in these equations is a function of catalyst decay and accordingly integrates catalyst decay with the chemical kinetics. These equations which described the reaction rates for the network of component lumps $y_1$–$y_4$ illustrated in FIG. 2, are based on lumped component balances applied to a small differential cross-section of the riser reactor 14 in FIG. 1.

Assuming complete vaporization of the feed; that no radial or actual dispersion occurs in reactor 14; that catalyst deactivation is slow relative to cracking; that cracking order of feed containing a wide variety of complex hydrocarbon molecules is effectively second order; and that cracking of combined gasoline and LCO follows a first order rate law; then writing simplified component balances for each lump of the reaction network of FIG. 2 gives:

$$\frac{dy_1}{dx} = \frac{K_0}{S}(\Phi)y_1^2 \quad (1)$$

$$\frac{dy_2}{dx} = \frac{K_{12}}{S}(\Phi)y_1^2 - \frac{K_2}{S}(\Phi)y_2 \quad (2)$$

$$\frac{dy_3}{dx} = \frac{K_{13}}{S}(\Phi)y_1^2 + \frac{K_{23}}{S}(\Phi)y_2 \quad (3)$$

$$\frac{dy_4}{dx} = \frac{K_{14}}{S}(\Phi)y_1^2 + \frac{K_{24}}{S}(\Phi)y_2 + \text{carbon residue} \quad (4)$$

where:

$y_1$=heavy oil lump (650° F.+), wt. fraction
$y_2$=gasoline+light cycle oil, (80°–650° F.), wt. fraction
$y_3$=light gases, $H_2$, $C_1$ etc, wt. fraction
$y_4$=coke, wt. fraction
x=normalized axial distance, $z/z_0$ dimensionless
$Z_0$=total reactor length, ft.
$K_0$=heavy oil cracking rate, $hr^{-1}$
$K_2$=gasoline plus LCO cracking rate, $hr^{-1}$
$K_{ij}$=formation rate of cracked product, $hr^{-1}$, i=reactant, j=product
S=weight hourly space velocity, $hr^{-1}$
$\Phi$=catalyst deactivation function Equations (1)–(4), which are simplified according to the above noted assumptions and which may be written in terms of the weight hourly space velocity, model the reaction network scheme illustrated in FIG. 2. Thus, the primary cracking of feed may result in a formation of gasoline plus LCO; light gases; or coke. An overcracking of the gasoline plus LCO lump may result in the formation of light gases and coke. Note also that coke formation can occur due to deposition of carbon residue on catalyst.

The solutions of equations (1)–(4) will be considered separately herein. Equation (1), describing conversion of the feed, may be rewritten as:

$$\frac{dy_1}{dx} = -A_0(\Phi)y_1^2 \quad (5)$$

where $$A_0 = K_0/S \quad (5)$$

In order to solve equation (5), it is necessary to specify the nature of the catalyst deactivation function Phi, which is known to be largely a function of catalyst residence time and essentially independent of the rate of the oil throughput, is described according to equation (6) below:

$$\Phi = t^{-N} \quad (6)$$

where:

N=deactivation constant, $hr^{-1}$ t=time

Since in moving bed reactors, the extent of catalyst decay at any actual position is simply the total time the catalyst is in the reactor "$t_c$" multiplied by the fractional distance "x" the catalyst has traversed, equation (6) may be expressed as:

$$\Phi = (t_c x)^{-N} \quad (7)$$

where:

$t_c$=catalyst residence time hr, and
$\Phi$, x and N are previously defined.

Substituting equation (7) into equation (5) and using the initial condition of $y_1$=1 at x=0 leads to an analytical solution for equation (5) as:

$$\epsilon = A_0 t_c^{-N}/((1-N) + A_0 t_c^{-N}) \quad (8)$$

where:

$\epsilon = (1-y_1)$ is the conversion $A_0$, $t_c$, and N are as previously defined.

Equation (8) may be placed in simpler form by rearranging:

$$\epsilon/(1-\epsilon) = A_0 t_c^{-N}/(1-N) \quad (9)$$

Equation (2), which depends on the degree of conversion of $y_1$, space velocity and the degree of catalyst deactivation, may be simplified by dividing equation (2) by equation (1) as follows, where it is assumed that deactivation due to the combined gasoline plus LCO cracking is the same as that due to cracking the feed.

$$\frac{dy_2}{dy_1} = -\frac{K_{12}}{K_0} + \frac{K_2}{K_0} \frac{y_2}{y_1^2} \quad (10)$$

Equation (10) can be solved in terms of the exponential integral of $r_2$ and $y_2/r_1$, or readily solved by standard numerical techniques using the initial conditions $y_2$=0 at x=0 and is given by $$y_2 = r_{12} r_2 e^{-r_2/y_1} [e^{r_2}/r_2 - y_1/r_2 \, e^{r_2/y_1} - E_{in}(r_2) + E_{in}(r_2/y_1)] \quad (11)$$

where:

$E_{in}$=exponential integral function
$r_{12} = K_{12}/K_0$, and
$r_2 = K_2/K_0$.

Equation (3) which depends on the concentration of $y_1$ and $y_2$, the space velocity, and the degree of catalyst deactivation, can be solved in a manner similar to the solution of equation (2). Dividing equation (3) by equation (1) shows that the change in the light gas lump $y_3$ is only a function of the ratio of rate constants and the concentration of $y_1$, $y_2$ as given by:

$$\frac{dy_3}{dy_1} = -\frac{K_{13}}{K_0} - \frac{K_{23} y_2}{K_0 y_1^2} \quad (12)$$

An approximate analytical solution for equation (12) can also be obtained. Using integration by parts for terms such as $y_2/y_1^2$, neglecting terms containing products such as ($r_2 \cdot r_{23}$), which should be very small, and with initial conditions $y_3$=0 at x=0, a solution is:

$$y_3 = r_{13}(1-y_1) + r_{23} y_2 (1/y_1 - 1) + r_{12} r_{23} \ln(y_1) \quad (13)$$

Equation (13) gives the yield for light gas production and it shows that light gas formation results from direct cracking of the feed, as well as overcracking of the gasoline plus LCO lump. This equation with appropriately determined rate constants can be used to predict production of ten light gases, as previously mentioned.

Equation (4) lies a form and depends on operating conditions similar to equation (3). Excluding the carbon residue part of the equation, the solution of equation (4) is identical to the solution of equation (3) with the use of appropriate rate constants. Thus, the formation of kinetic coke results from the direct cracking of the feed, as well as overcracking of the combined gas oil and LCO lump.

In the present model for coke yield, kinetic and contaminate coke, which both result from the cracking process, are combined into a single equation where the amount of Ramsbottom carbon residue (RCR) on a weight fraction basis is added directly to the total coke yield as given in:

$$y_4 = r_{14}(1-y_1) + r_{24}y_2(1/y_1 - 1) + r_{12}r_{24}\ln(y_1) + RCR \quad (14)$$

where:

$r_{14} = K_{14}/K_0$ $r_{23} = K_{23}/K_0$

Equations (9), (11), (13), and (14) are the solutions of the differential equations for the mathematical model of the reaction network illustrated in FIG. 2. The parameters that must be known are $K_0$, N, $r_2$, $r_{12}$, $r_{13}$, $r_{14}$, $r_{23}$, $r_{24}$, and RCR. The variables which must be specified before these equations can be solved are S and $t_c$.

Rate Constant Determination

In determining reaction rate constants which best fit product yields predicted by equations (9), (11), (13) and (14) to actual historical data defining material balances around a commercial reactor, the rate constants should be determined in a manner such that they can compensate for the variations in feed and catalyst properties which typically occur on a regular basis in the reactor. Accordingly, such properties as catalyst activity, contaminate metals and basic nitrogen in the feed, and other important properties which describe the chemistry of the catalyst/feed system should be factors in the rate constants. Generally, it is inconvenient, if not impossible, to individually test a large number of sets of different feed/catalyst combinations covering a wide range of operating conditions in a commercial reactor to provide sufficient data from which reliable reaction rate parameters, which do depend on feed and catalyst properties, can be estimated.

In accordance with one aspect of this invention, a linear mathematical equation which establishes the dependence of rate constants on feed and catalyst properties is assumed, so as to enable simultaneous determination of reaction rate constants as function of feed and catalyst properties, and wherein the determined constants also fit actual reactor operating data.

Selection of feed properties that most affect the crackability of the feed, and catalyst properties that most affect the selectivity of the conversion may be limited by the available operating data of a commercial unit. In many refineries, however, feed properties such as: API gravity, sulfur content, basic nitrogen, Ramsbottom carbon residue, nickel, and vanadium are measured even on a daily basis. For the catalyst, the equilibrium nickel and vanadium metals levels and the coke on regenerated catalyst may also be measured.

To illustrate an example of effective characterization of heavy oil for modeling a riser reactor, it was found that the following four oil properties were effective:

(1) API gravity (API)
(2) sulfur content (SUL)
(3) basic nitrogen ($BN_2$), and
(4) Ramsbottom carbon residue (RCR).

For catalyst characterization, the properties selected were:

(5) coke on regenerated catalyst (CRC)
(6) a metals content term defined as 0.5 Ni+V (NIEQ), and
(7) Davison MAT conversion (MAT) provided from equilibrium catalyst analyses.

While it would have been desirable to include a catalyst property such as unit cell size, rare earth content or micropore/macropore surface area to characterize the catalyst, the MAT (micro activity test) results substantially according to ASTM D3907-80 is satisfactory and more convenient. Also it is noted that the other catalyst properties are easily measured.

For inclusion of the effect of slurry recycle oil, the following operating condition selected was:

(8) a weight throughput ratio (TPR).

Selection of a mathematical equational form to describe the dependence of the rate constants on the eight properties listed above is a critical feature of this invention. Since a high degree of linear correlation may exist between the above properties, e.g. API gravity and Ramsbottom carbon residue, a statistical multivariate technique known as "principal component analysis" was employed to establish a genuine dependence of the rate constants on the oil and catalyst properties. This principal component analysis is explained in an article "Analysis of a Complex of Statistical Variables into Principal Components", H. Hotelling, Journal of Educational Psychology, 24, 417–441 and 498–520, 1933.

In the principal component analysis for a given data set with "p" numeric variables, "p" principal components can be computed, where each principal component is expressed as a unique linear combination of the original oil and catalyst property variables. This analysis is useful in the present invention because it removes linear correlation between the "p" variables by making linear mathematical combinations of the variables, which are both orthogonal and uncorrelated.

To specifically relate reaction rate constants for cracking the 650° F.+ lump $y_1$ to oil and catalyst properties, as illustrated by $K_{12}$ and $K_{14}$ in FIG. 2, an equation which is a function of the eight principal components corresponding to the eight properties was assumed as follows:

$$K_{(i)} = \text{const}_{(i)}(1 + CPC1(i) \cdot PC_1 + \ldots + CPC8(i) \cdot PC_8) \quad (15)$$

where:

$K_{(i)}$ for
  i=1 is $K_0$
  i=2 is N
  i=3 is $r_{12}$
  i=4 is $r_{14}$ $\text{CONST}_{(i)}$ is a multiplier term for all principal components.

CPC1(i) through CPC8(i) are independent coefficients of the principal components in each (i) equation.

According to equation (15), a different coefficient for each of the eight principal components plus an overall constant must be determined for calculating the decay constant N and each of the rate constants $K_0$, $r_{12}$, and $r_{14}$. Coefficients for the above principal components, which were determined by nonlinear regression analysis based on the historical product yield data given in Table I, are presented in Appendix A and will be more fully explained hereinafter.

It is noted, however, that for the particular commercial reactor for which product yield data of Table I was statistically applied simultaneously to equations (15) and (11), the value of $r_2$ resulted in a negative number. Since $r_2$ is a measure of overcracking, as shown in equation (11), the fact that a negative rate constant was calculated is thought to be due to the lack of historical data in the overcracking region (gasoline cracking) to accurately determine this parameter. Accordingly, for the coefficients, which are listed in Appendix A, laboratory data based on actual samples from the reactor were used to calculate $r_2$ and the laboratory data based value of $r_2$ was then used with the historical reactor data to obtain $r_{12}$ as a function of oil and catalyst properties. Accordingly, rate constants $r_2$, $r_{23}$ and $r_{24}$, which as illustrated in FIG. 2 describe cracking, or more specifically overcracking, of gasoline and light cycle oil to still lighter components were not determined as functions of oil and catalyst properties in this example. Equations (16) and (17) show the independence of $r_2$ and $r_{24}$ from oil and catalyst properties.

$$r_2 = CONSTANT \quad (16)$$

$$r_{24} = CONSTANT \quad (17)$$

To specifically relate reaction rate constant $r_{13}$ to catalyst and oil properties for each of ten (10) light gases, the following equations were assumed:

$$r_{13(i)} = R13CON(i) \ (1 + P13(i)1 \cdot PC_1 + \ldots + P13(i)8 \cdot PC_8) \quad (18)$$

$$r_{23} = R23CONT(i) \quad (19)$$

where:

i=1 for $H_2$ i=2 for $C_1$ i=3 for $C_2=$ i=4 for $C_2$ i=5 for $C_3=$ i=6 for $C_3$ i=7 for $iC_4=$ i=8 for $C_4=$'s i=9 for $iC_4$, and i=10 for $nC_4$, for each of equations (18) and (19).

According to equation 18, eight different coefficients for the principal components plus an overall constant must be determined for calculating the rate constant $r_{13}$ for each of the light gases. Like rate constant $r_2$ and $r_{24}$ in this example, constant $r_{23}$ does not depend on oil and catalyst properties.

Statistical methods for fitting actual data to parameters, such as constants found in equations (9), (11) and (13)–(19), have been well established. Over the years, a number of digital computer programs have been developed which facilitate fitting data to nonlinear equations. One such program which also provides a technique for principal component analysis, as well as nonlinear regression for fitting data, and further provides a least squares estimate of the accuracy of the fit, is the "SAS Statistical Analysis System" version 5 edition, SAS Institute, Inc., 1985.

The regression problem is that of estimating certain unknown parameters occurring in a function which includes multiple variables. For example in equation (9), conversion of feed stock is nonlinearly dependent upon space velocity S and catalyst residence time $t_c$, and the statistical regression program available in SAS Version 5, Chapter 25 can determine the values of $K_0$ and $N$ which substantially fit actual conversion data from which the estimate is made. $K_0$ and $N$, however, are first expressed as function of principal components, as illustrated in equation (15). Then equation (15) is combined with equation (9) such that the regression involves determining each of the coefficient and constants in equation (15) that substantially fit the prediction of equation (9) to actual data. Equation (15) is likewise combined with equations (11) and (14) for estimating $r_{12}$ and $r_{14}$.

Table I below provides a wide range of historical steady state data for a commercial reactor from which the principal components in equation (20), and the coefficients for the principal components in equation (15) can be estimated. The data in Table I show high, low and average values for: oil and catalyst properties; reactor operating conditions; and product yields. These data were obtained over a period of several months such that the average values include approximately 100 steady state data sets.

TABLE 1

Historical Reactor Data

Oil Properties:

| | Feed API | wt % sulfur | wt % Ramsbottom carbon residue | Basic nitrogen, ppm |
|---|---|---|---|---|
| Average | 19.4 | 0.44 | 4.8 | 838 |
| Minimum | 17.4 | 0.26 | 1.0 | 626 |
| Maximum | 21.5 | 0.70 | 6.4 | 1337 |

Catalyst Properties:

| | ppm equivalent metals (0.5 Ni + V) | wt % Coke Regen. catalyst | Davison MAT number |
|---|---|---|---|
| Average | 4262 | 0.08 | 67 |
| Minimum | 3586 | 0.00 | 62 |
| Maximum | 5404 | 0.19 | 72 |

Operating Conditions:

| | Through-put (wt.) ratio | FF Rate, BPD | Recycle Rate, BPD | 90% Gasoline Cutpoint, °F. |
|---|---|---|---|---|
| Average | 1.06 | 52,430 | 2,835 | 369 |
| Minimum | 1.02 | 36,070 | 717 | 333 |
| Maximum | 1.23 | 56,290 | 10,446 | 391 |

| | C/O Ratio | Riser Temperature, °F. | Regenerator Temperature, °F. |
|---|---|---|---|
| Average | 7.6 | 980 | 1280 |
| Minimum | 5.8 | 978 | 1250 |
| Maximum | 8.9 | 981 | 1330 |

Product Yields (wt %):

| | Hydrogen | Methane | Ethylene | Ethane | Propylene |
|---|---|---|---|---|---|
| Average | 0.17 | 1.49 | 1.15 | 1.26 | 4.03 |
| Minimum | 0.12 | 0.79 | 0.83 | 0.90 | 2.98 |
| Maximum | 0.25 | 1.94 | 1.53 | 1.55 | 4.48 |

| | Propane | i-Butylene | Butylenes | i-Butane | n-Butane |
|---|---|---|---|---|---|
| Average | 1.53 | 1.24 | 3.81 | 3.16 | 1.21 |
| Minimum | 1.21 | 1.00 | 3.12 | 2.34 | 0.90 |
| Maximum | 1.79 | 1.44 | 4.39 | 4.12 | 1.96 |

| | Butane-free Gasoline | LCO | HCO | Decant Oil | Coke | Conversion |
|---|---|---|---|---|---|---|
| Average | 46.07 | 16.02 | 2.06 | 4.76 | 12.03 | 77.16 |
| Minimum | 39.32 | 12.20 | 0.25 | 1.57 | 8.27 | 68.70 |
| Maximum | 50.88 | 24.63 | 7.15 | 10.31 | 15.49 | 82.20 |

Table II below shows the results of the statistical principal component analysis carried out with the SAS routine for principal component analysis using data sets for eight selected oil and catalyst properties which are given in Table I. The statistically determined results as shown in Table II give the eigenvectors for the eight principal components, and each principle component of interest is determined from its eigenvector of Table II as exemplified by equation (20) below, which is the equation for the first principal component.

TABLE II

Statistical Principal Component Analysis

| Property | PC1 | PC2 | PC3 | PC4 |
|---|---|---|---|---|
| API Gravity | −0.537322 | 0.189605 | 0.173114 | 0.135917 |
| wt % Sulfur | 0.278123 | −0.562200 | −0.131969 | 0.436107 |
| Rams. Carbon | 0.290601 | −0.130067 | −0.427003 | −0.522339 |
| Basic $N_2$ | 0.524190 | 0.135901 | 0.207000 | −0.180535 |
| Coke on Catalyst | 0.286753 | 0.442369 | −0.027418 | 0.576390 |
| 0.5 Ni + V | 0.179288 | 0.382094 | −0.581100 | 0.226448 |
| Through-put Ratio | 0.264146 | 0.442356 | 0.396703 | −0.251215 |
| MAT Number | 0.306121 | −0.274282 | 0.481283 | 0.198228 |

| Property | PC5 | PC6 | PC7 | PC8 |
|---|---|---|---|---|
| API Gravity | 0.472986 | 0.057015 | 0.047024 | 0.630647 |
| wt % Sulfur | −0.242193 | 0.276003 | −0.065249 | 0.509786 |
| Rams. Carbon | 0.501448 | 0.117355 | −0.391119 | 0.158958 |
| Basic $N_2$ | −0.011696 | −0.578243 | 0.342941 | 0.423325 |
| Coke on Catalyst | 0.150840 | −0.206737 | −0.565944 | −0.057619 |
| 0.5 Ni + V | 0.136595 | 0.284078 | 0.579454 | −0.030416 |
| Through-put Ratio | −0.257061 | 0.634120 | −0.114079 | 0.181282 |
| MAT Number | 0.598789 | 0.216531 | 0.232108 | −0.317527 |

$PC_1 = -\,(0.537322 * API) + (0.278123 * SUL) + (0.290601 * RCR)$ (20) $+ (0.524190 * BN2) + (0.286753 * CRC) + (0.170288 * NIEQ) + (0.264146 * TPR) + (0.306121 * MAT)$

Similar equations using the values in Table II are utilized for principal components 2 through 8.

Values for the coefficients for the principal components required in equation (15) e.g. CPC1(i) through CPC8(i), where (i) ranges from 1 to 4, are given in Appendix A. Also given in Appendix A is the constant $r_2$. Using the coefficients and other constants in Appendix A, equation (15) yields the reaction rate constants $K_0$, N, $r_{12}$, and $r_{14}$ for use in equations (9) and (14) for predicting conversion of feed and yields of gasoline and coke.

According to equation (18), eight different coefficients for the principal components plus an overall constant must also be determined for calculating the rate constant $r_{13}$ for each of the light gases. Like rate constant $r_2$ and $r_{24}$ in this example, constant $r_{23}$ does not depend on oil and catalyst properties.

Values for coefficients $P13(i)_1$ through $P13(i)_8$ and the constants R13CON(i) required in equation (18) were determined in a manner similar to that described for equation (15) and are given in Appendix B. Equation (18) then yields the reaction rate constant $r_{13}$ for predicting yields of each of the 10 light gases according to equation (14). Also given in Appendix B are the constants $r_{23}$ for use in equation (14).

Computer Simulation

Figure 3:
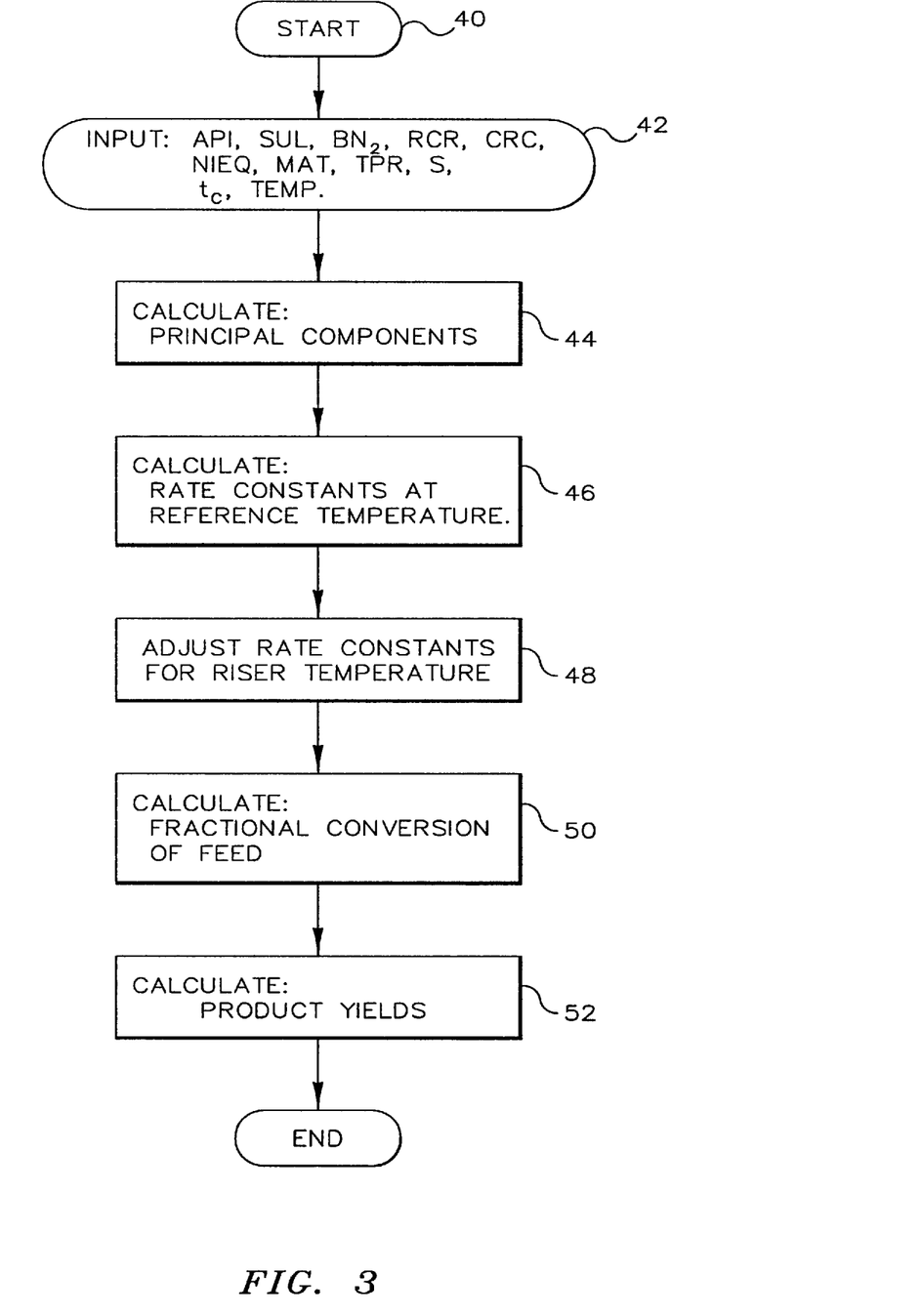
FIG. 3 is a computer flow diagram illustrating the riser reactor simulation algorithm according to the present invention.
Figure 4:
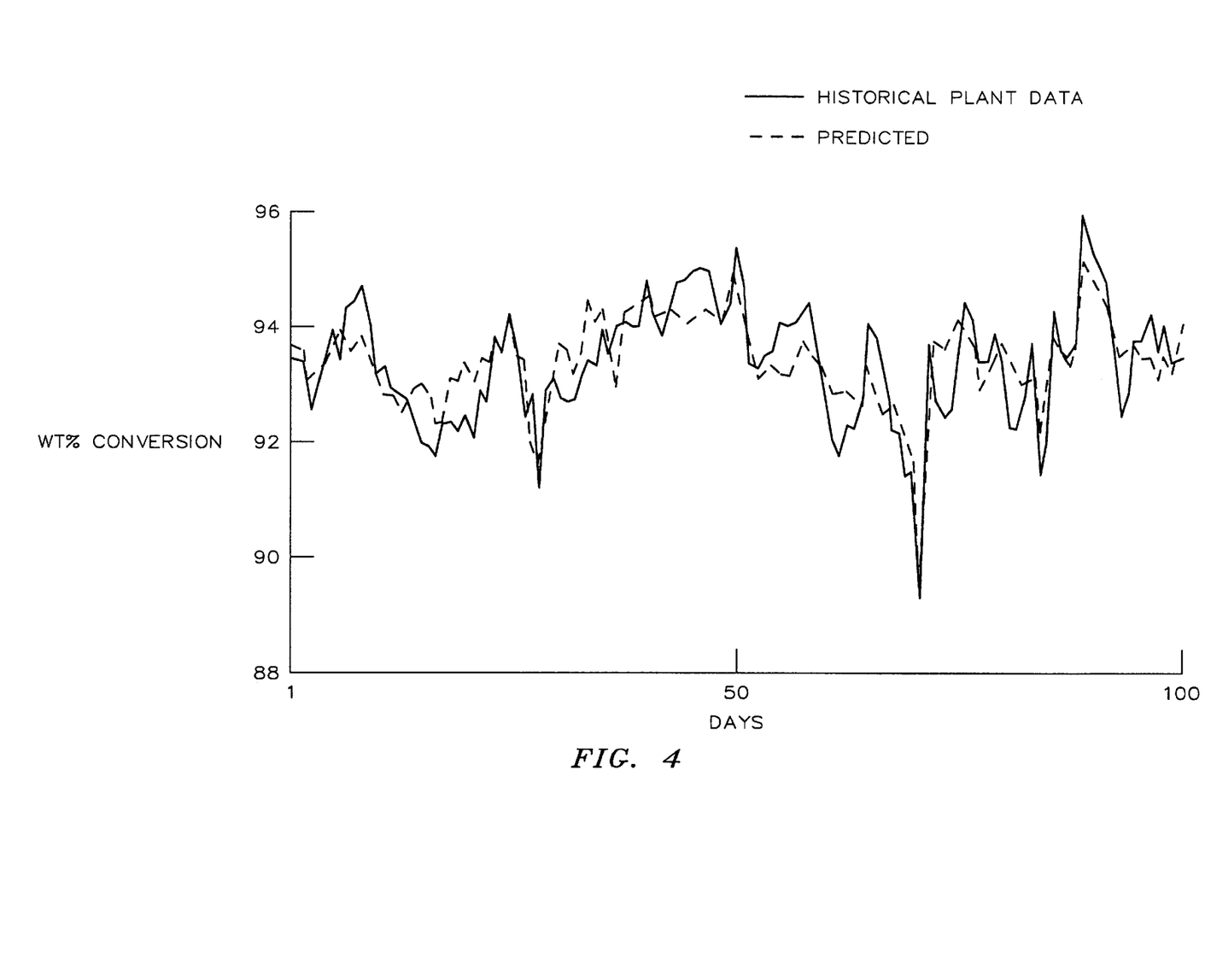
FIG. 4–8 are graphic illustrations comparing computer generated predictions of reaction conversion and product yields with actual plant data.
Figure 5:
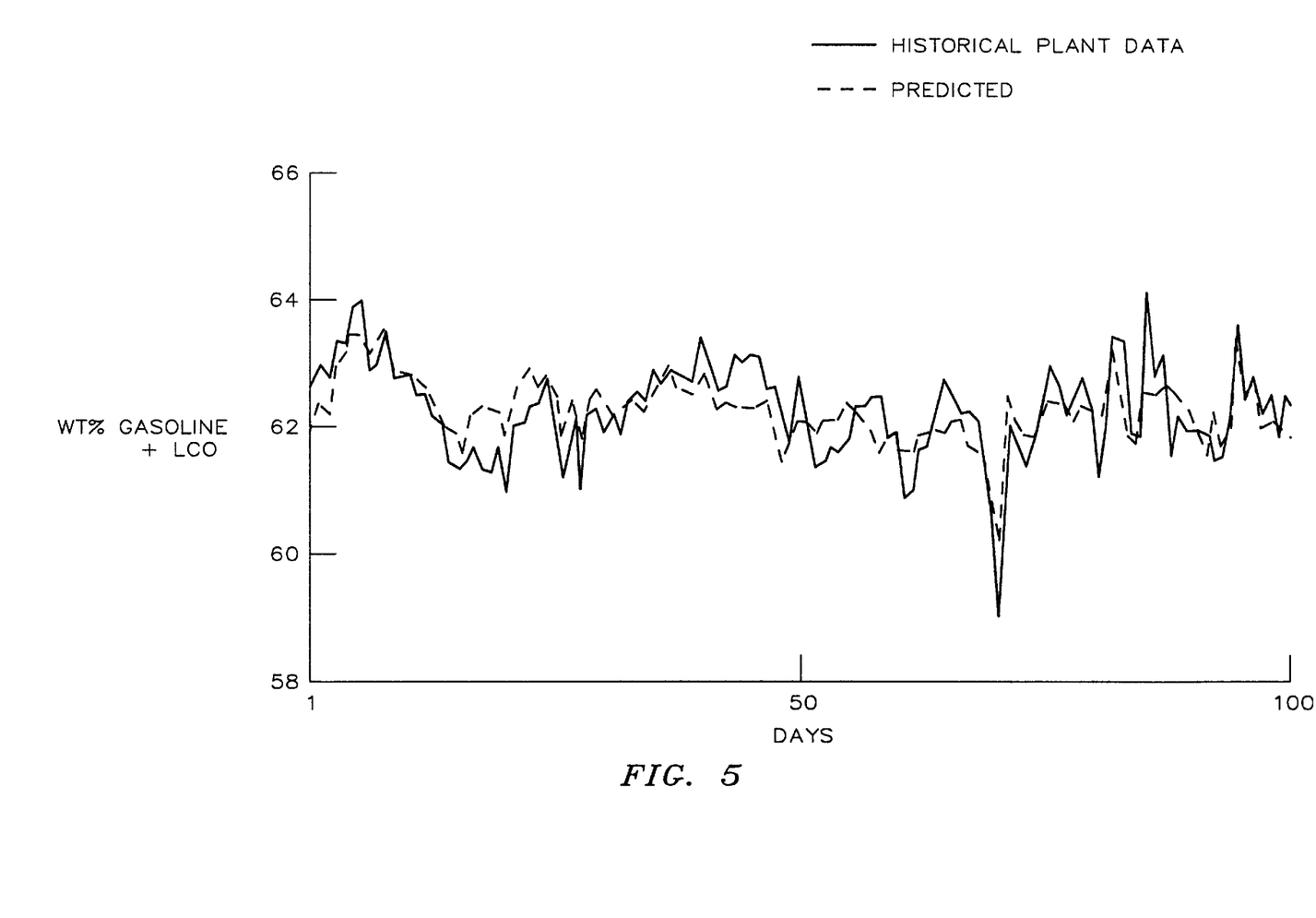
Figure 6:
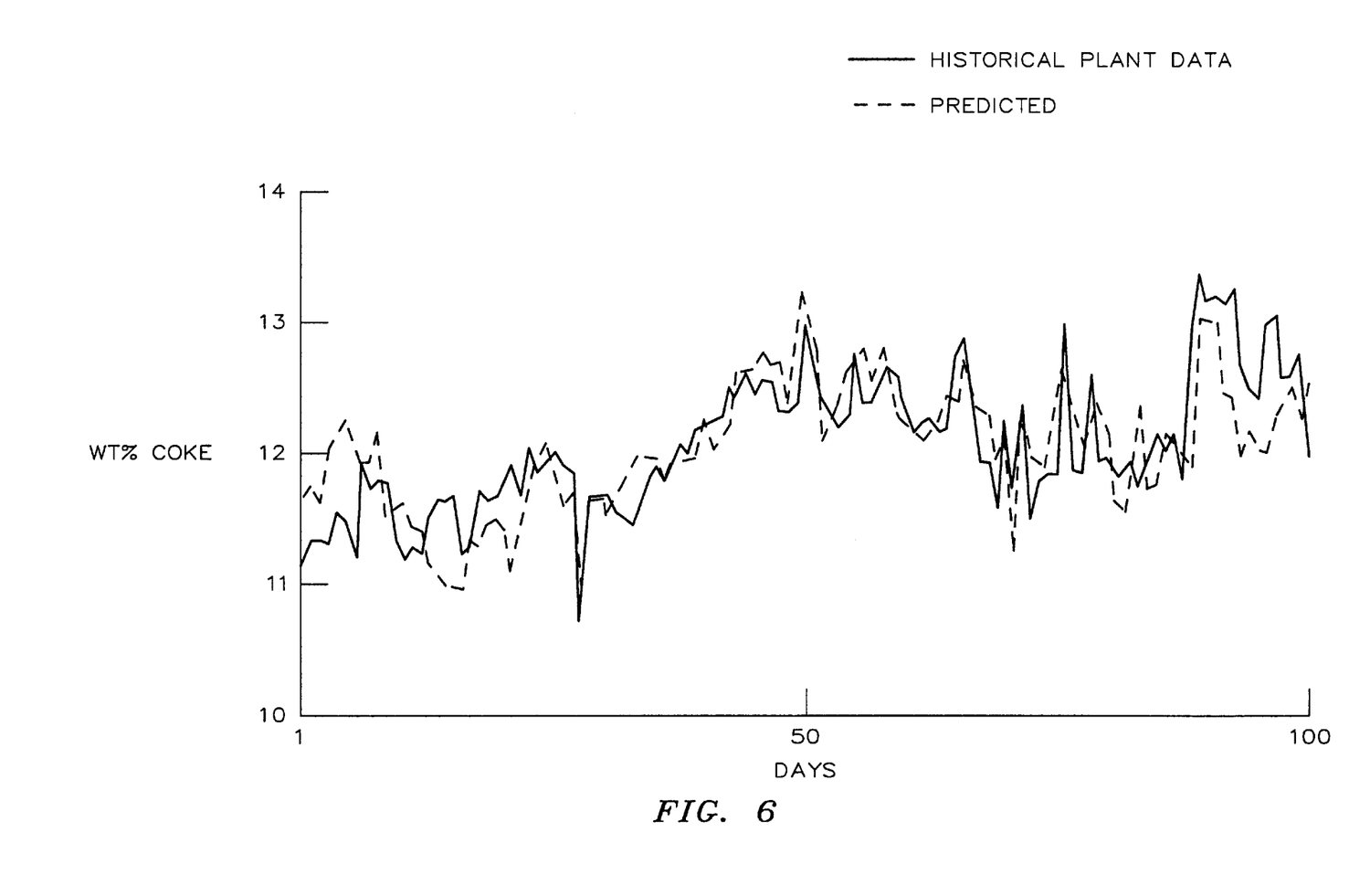
Figure 7:
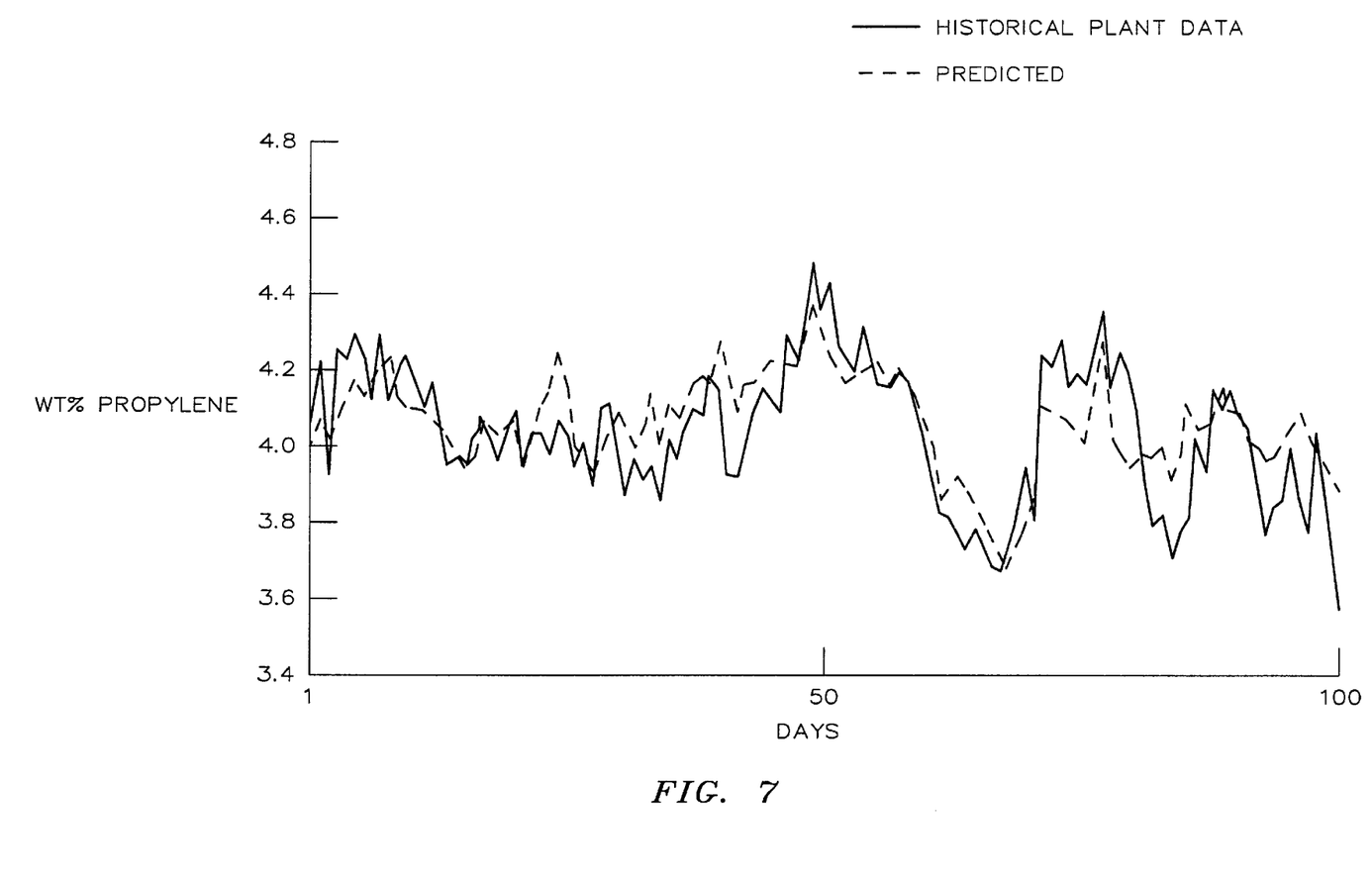
Figure 8:
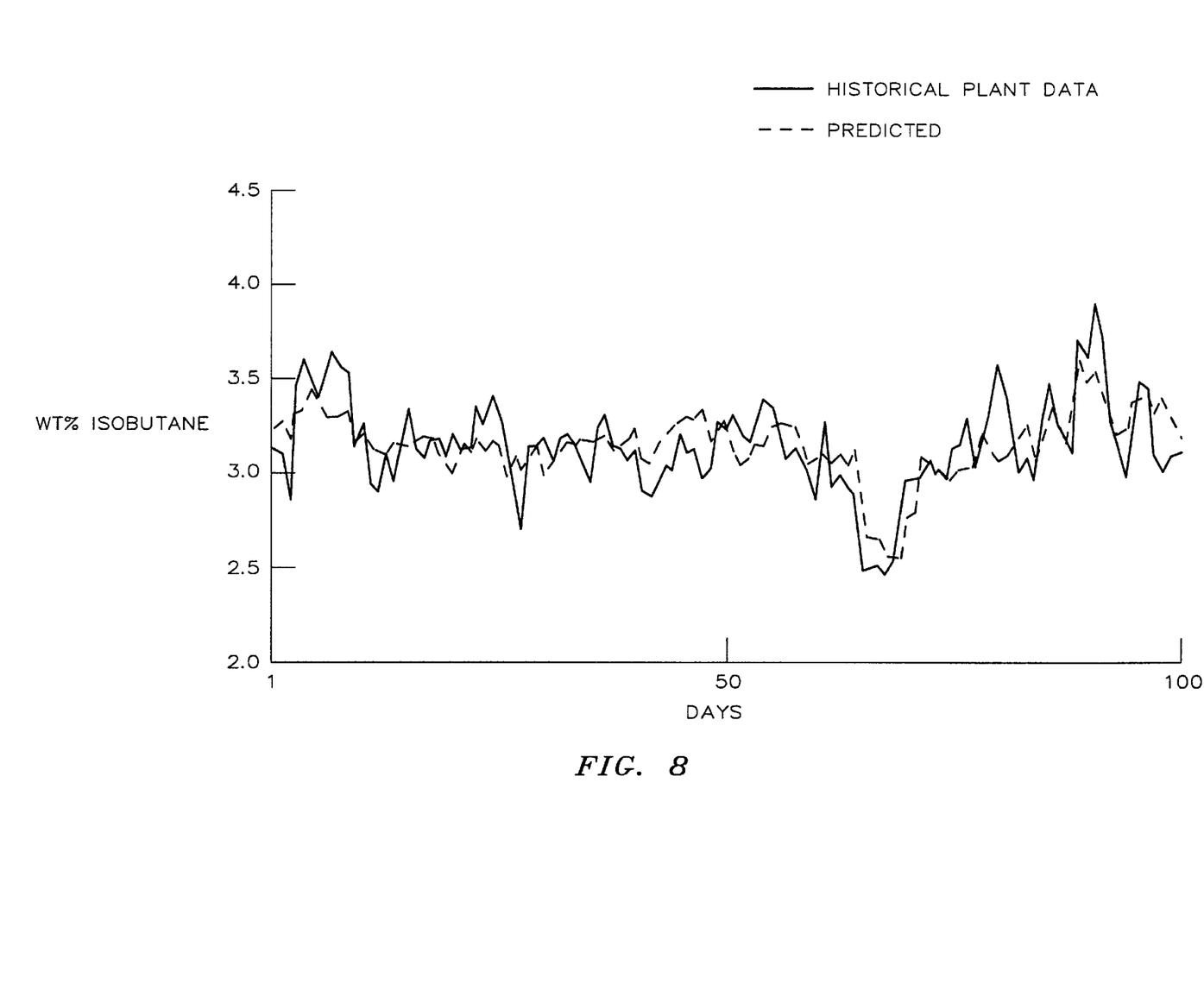

For simulating a reaction on a digital computer, is only necessary to provide the computer with necessary data and to program the computer with a routine that describes what is happening in the reactor. Referring now to FIG. 3, there is illustrated a flow sheet of a computer routine called "YIELDS" which defines a sequence of computer operations for predicting the fractional conversion of heavy oil and the weight fraction of products of lower molecular weight produced in the reactor. The prediction is based on the solution of equations (1)–(4) which are stored in the routine along with coefficients and constants shown in Table II, Appendix A and Appendix B. The solutions reveal the variation of product yields with time.

The routine "YIELDS" is made operational at a start step 40, as illustrated in FIG. 3 when called by a mainline program (not illustrated) but which will typically be a heat balance routine between the reactor and regenerator of the FCC process. Referring to flow block 42, values for oil and catalyst properties and operating data symbolically indicated in block 42 are input into the routine. Values for these properties and operating conditions are found in Table I. Values for S and $t_c$ must also be specified.

In calculation block 44, the routine calculates eight principal components, as defined by equation 20 as a first calculation step. Next the routine proceeds to calculation block 46 to calculate the rate constants at the reference temperature using the principal components calculated in the previous step and the coefficients and constants shown in Appendix A. Constants $K_0$, N, $r_{12}$ and $r_{14}$ are calculated in accordance with equation (15) and the coefficients in Appendix A. $r_2$ and $r_{24}$ are calculated in accordance with equation (16) and (17), respectively.

In a similar manner, constants $r_{13}(i)$ are calculated using the principal components and the coefficients in Appendix B in equation (18) to give rate constants for each of the ten light gases.

The functions used in step 48 to adjust the rate constants based on the riser temperature (TRISER) are defined as:

$$K = Ke^{EC/R(T_R)} \quad (21)$$

$$N = Ne^{ED/R(T_R)} \quad (22)$$

$$T_c = e^{(EG-EC)/R(T_R)} \quad (23)$$

where:

EC=Cracking Activation Energy=15,000 BTU/lb-mole

ED=Deactivation Energy-1,500 BTU/lb-mole

EG=Overcracking Activation energy=28,690 BTU/lb-mole

R=1.9865

$T_R$=(1/TREF−1/TRISER)

$T_c$=multiplier term for rate constants for overcracking and TREF and TRISER are in °K.

The activation energies EC, ED and EG in equations 21, 22 and 23 were determined based on a combination of laboratory and literature data and accordingly provide capacity for the model to make predictions beyond the historical operating data shown in Table I.

In block 48, the rate constants $K_0$, N used for calculating conversion of the feed stock are adjusted for a riser temperature that is different from the reference temperature using the Arrhenius type equations 21 and 22, respectively. Rate constants involving overcracking, $r_2$, $r_{24}$, $r_{23}H_2$, $r_{23}C_1$, $r_{23}C_2U$, $r_{23}C_2$, $r_{23}C_3U$, $r_{23}C_3$, $r_{23}I4U$, $r_{23}C_4U$, $r_{23}i$-$C_4$ and $r_{23}n$-$C_4$ are each corrected by multiplying the rate constant by the temperature coefficient $T_c$ calculated in equation (23).

It is noted that temperature dependence for the entire reaction network enters through only three rate constants. This is because the other rate constants are a ratio representing the partitioning of cracking and overcracking rates. Accordingly, $K_0$, N and $K_2$ which respectively represent cracking, deactivation and overcracking are adjusted for riser temperatures.

Next the routine proceeds to calculation block 50 where the fractional conversion of feed is calculated according to equation (9), and then calculation of the yields for gasoline plus LCO, light gases, and coke are effected in flow block 52 according to equations (11), (13) and (14).

Comparison of predicted product yields with actual reactor yields over a period of time is illustrated in FIGS. 4–8, where the actual reactor yields shown in the figures were used to estimate the rate constants.

In summary, the lump reaction scheme to represent the reactors steady state behavior was developed in a general fashion. The resulting kinetic equations are based on realistic assumptions for vapor phase plug flow reactors with parameters for the kinetic equations established as functions of properties characterizing both the feed oil and catalyst. Values for the parameters were determined from historical operating data by statistical regression.

While the invention has been described in terms of the presently preferred embodiment for modeling and simulating heavy oil cracking, reasonable variations and modifications such as simulating the cracking of various crude feedstocks having a normal boiling range lower than the heavy oil range, or selecting various combinations of oil and catalyst properties for determining reaction rate constants are possible by those skilled in the art and such variations and modifications are within the scope of the described invention and the appended claims.

APPENDIX A

Coefficients for equation (15)

Second-Order Conversion

| | K | | N |
|---|---|---|---|
| CONST(1) | 0.537350995 | CONST(2) | 0.378659040 |
| KPC(1) | 2.323695900 | NPC(1) | −0.087525820 |
| KPC(2) | 3.540902091 | NPC(2) | −0.131753931 |
| KPC(3) | 4.126038050 | NPC(3) | −0.261234733 |
| KPC(4) | −1.991874831 | NPC(4) | 0.1282709Q6 |
| KPC(5) | −2.416528240 | NPC(5) | 0.135514088 |
| KPC(6) | 4.723341153 | NPC(6) | −0.143593842 |
| KPC(7) | −2.390611813 | NPC(7) | 0.210322989 |
| KPC(8) | 1.451113078 | NPC(8) | −0.030946343 |

Combined Gasoline and LCO

| | R12 | | $r_2$ |
|---|---|---|---|
| CONST(3) | 0.834103505 | CONST | 0.0020 |
| P12PC(1) | −0.054536598 | | |
| P12PC(2) | −0.090930051 | | |
| P12PC(3) | 0.032182047 | | |
| P12PC(4) | −0.031830894 | | |
| P12PC(5) | 0.005061930 | | |
| P12PC(6) | −0.081327701 | | |
| P12PC(7) | −0.035748398 | | |
| P12PC(8) | −0.014577910 | | |

Coke

| | R14 | | $r_{24}$ |
|---|---|---|---|
| CONST(5) | 0.032653450 | CONST | 0.00117 |
| P14PC(1) | 0.771140392 | | |
| P14PC(2) | 1.344767527 | | |
| P14PC(3) | 0.091193357 | | |
| P14PC(4) | 0.306411743 | | |
| P14PC(5) | −0.316157854 | | |
| P14PC(6) | 1.234151270 | | |
| P14PC(7) | 0.143203772 | | |
| P14PC(8) | 0.259809401 | | |

APPENDIX B

Coefficients for equation (20)

Hydrogen

| | R13H2 | | $r_{23}H_2$ |
|---|---|---|---|
| R13CON(1) | 0.001404010 | R23CON | 0.0 |
| P13H2(1) | 1.131286616 | | |
| P13H2(2) | 2.223766275 | | |

APPENDIX B-continued

Coefficients for equation (20)

| P13H2(3) | 0.4167154 |
| P13H2(4) | −0.164206705 |
| P13H2(5) | −0.428588006 |
| P13H2(6) | 1.934695075 |
| P13H2(7) | −0.036677652 |
| P13H2(8) | 0.271367970 |

Methane

| | R13C1 | | $r_{23}C_1$ |
|---|---|---|---|
| R13CON(2) | 0.0087266498 | R23CON | 0.0 |
| P13C1(1) | 0.021257835 | | |
| P13C1(2) | −0.061606723 | | |
| P13C1(3) | 0.063704106 | | |
| P13C1(4) | −0.135549711 | | |
| P13C1(5) | −0.106744337 | | |
| P13C1(6) | 0.216176472 | | |
| P13C1(7) | 0.112674968 | | |
| P13C1(8) | 0.106005763 | | |

Ethylene

| | R13C2U | | $r_{23}C_2^=$ |
|---|---|---|---|
| P13CON(3) | 0.007029334 | R23CON | 0.0 |
| P13C2U(1) | −0.698968495 | | |
| P13C2U(2) | −0.859732242 | | |
| P13C2U(3) | 0.746173939 | | |
| P13C2U(4) | −1.764424540 | | |
| P13C2U(5) | −0.507133138 | | |
| P13C2U(6) | 0.547936261 | | |
| P13C2U(7) | 0.839038611 | | |
| P13C2U(8) | 0.078929024 | | |

Ethane

| | R13C2 | | $r_{23}C_2$ |
|---|---|---|---|
| R13CON(4) | 0.007587653 | R23CON | 0.0 |
| P13C2(1) | −0.608079449 | | |
| P13C2(2) | −1.148920348 | | |
| P13C2(3) | 0.309537532 | | |
| P13C2(4) | −1.388890121 | | |
| P13C2(5) | −0.469752353 | | |
| P13C2(6) | 0.546380553 | | |
| P13C2(7) | 1.075346377 | | |
| P13C2(8) | 0.240910363 | | |

Propylene

| | R13C3U | | $r_{23}C_2^=$ |
|---|---|---|---|
| R13CON(5) | 0.0530766607 | R23CON | 0.00023 |
| P13C3U(1) | −0.111000159 | | |
| P13C3U(2) | −0.095610991 | | |
| P13C3U(3) | −0.196890641 | | |
| P13C3U(4) | 0.165300014 | | |
| P13C3U(5) | 0.179429805 | | |
| P13C3U(6) | −0.359608338 | | |
| P13C3U(7) | −0.009922099 | | |
| P13C3U(8) | −0.143254425 | | |

Propane

| | R13C3 | | $r_{23}C_3$ |
|---|---|---|---|
| R13CON(6) | 0.0108468661 | R23CON | 0.0 |
| P13C3(1) | −0.169210975 | | |
| P13C3(2) | 0.318004770 | | |
| P13C3(3) | −0.100371523 | | |
| P13C3(4) | −0.001697310 | | |
| P13C3(5) | 0.249181545 | | |
| P13C3(6) | −0.326655462 | | |
| P13C3(7) | 0.065549329 | | |
| P13C3(8) | −0.337064309 | | |

APPENDIX B-continued

Coefficients for equation (20)

Isobutylene

| | R1314U | | $r_{23}iC_4^=$ |
|---|---|---|---|
| R13CON(7) | 0.0114513132 | R23CON | 0.00006 |
| P1314U(1) | −0.141985459 | | |
| P1314U(2) | −0.127279264 | | |
| P1314U(3) | −0.376752221 | | |
| P1314U(4) | 0.035326466 | | |
| P1314U(5) | 0.148264890 | | |
| P1314U(6) | −0.136164446 | | |
| P1314U(7) | 0.411390241 | | |
| P1314U(8) | −0.99133168 | | |

Other Butylenes

| | R13C4U | | $r_{23}C_4^=$ |
|---|---|---|---|
| R13CON(8) | 0.0370957595 | R23CON | 0.00014 |
| P13C4U(1) | −0.127222008 | | |
| P13C4U(2) | −0.100511773 | | |
| P13C4U(3) | −0.356176150 | | |
| P13C4U(4) | 0.031293769 | | |
| P13C4U(5) | 0.138041972 | | |
| P13C4U(6) | −0.114305549 | | |
| P13C4U(7) | 0.393186363 | | |
| P13C4U(8) | −0.93458591 | | |

Isobutane

| | R131C4 | | $r_{23}iC_4$ |
|---|---|---|---|
| R13CON(9) | 0.0623951030 | R23CON | 0.00040 |
| P131C4(1) | 0.045559201 | | |
| P131C4(2) | −0.040582547 | | |
| P131C4(3) | −0.144933855 | | |
| P131C4(4) | 0.398584988 | | |
| P131C4(5) | 0.132101248 | | |
| P131C4(6) | −0.323605497 | | |
| P131C4(7) | −0.250374237 | | |
| P131C4(8) | −0.038245750 | | |

Butane

| | R13NC4 | | $r_{23}nC_4$ |
|---|---|---|---|
| R13CON(10) | 0.0163822343 | R23CON | 0.0 |
| P13NC4(1) | 0.089384065 | | |
| P13NC4(2) | 0.226170403 | | |
| P13NC4(3) | −0.366334126 | | |
| P13NC4(4) | 0.503642063 | | |
| P13NC4(5) | 0.253416557 | | |
| P13NC4(6) | −0.310446684 | | |
| P13NC4(7) | −0.073425500 | | |
| P13NC4(8) | −0.147416700 | | |

That which is claimed is:

1. A method of simulating a hydrocarbon cracking reaction in which a computer is used to predict results of a catalytic cracking reaction wherein a feedstream, which contains a multiplicity of hydrocarbons of complex high molecular weight molecules having various boiling ranges, is contacted with an active catalyst under cracking conditions to produce at least one hydrocarbon reaction product of a lower molecular weight, said method comprising the following steps:

(a) defining for said computer a plurality of lumps for said multiplicity of hydrocarbons, wherein said lumps are defined according to boiling range into lumped species representing a reactants lump, an intermediate component lump, and at least one reaction product lump;

(b) defining in said computer a reaction conversion network for said lumped species with reaction paths in said conversion network flowing from heavier to lighter components;

(c) constructing a chemical kinetic cracking equation in terms of reactants and product lumps for each step in said reaction network, wherein said equation integrates catalyst decay with chemical kinetics;

(d) constructing a data base of historical data wherein said data is produced by measurements made on a reactor operating under cracking conditions said historical data further including measured bulk properties of both oil and catalyst, and providing said computer with said historical data base for simulating said cracking reaction;

(e) calculating reaction rate constants in said computer for said kinetic cracking equations, wherein said reaction rate constants are determined from a plurality of bulk properties of both oil and catalyst from said historical operating data of said reactor;

(f) calculating values in said computer for conversion of said feedstream and values for yield of said reaction product based on reaction rate constants determined in step (e); and (g) providing computer generated displays of conversion of said feedstream and yield of said product which simulate said cracking reaction.

2. A method in accordance with claim 1, wherein said reaction rate constants are determined using the technique of a principal component analysis, and wherein said database includes at least:

oil properties of fresh feed, recycle/through-put ratio, equilibrium catalyst properties, space velocity, residence time and reaction temperature for the reaction to be simulated; and predetermined coefficients based on said historical operating data of said reactor for use in said principal component analysis.

3. A method in accordance with claim 2, wherein said reaction rate constants are adjusted for reactor temperature according to an Arrhenius type equation.

4. A method in accordance with claim 1 wherein said reactants lump comprises hydrocarbons boiling above about 650° F., said intermediate component lump comprises gasoline and light cycle oil having a boiling range of $C_5^+$ to about 650° F., a first final product lump comprises light gases $H_2$ and $C_1$–$C_4$, and a second final product lump comprises coke.

5. A method in accordance with claim 1 wherein said cracking reaction is carried out in a riser reactor and said catalyst decay is described as a function designated phi $\Phi$, of catalyst residence time according to the equation:

$$\Phi = (t_c x)^{-N}$$

where:

N=deactivation constant $t_c$=catalyst residence time, and x=normalized distance for riser reactor.

6. A method in accordance with claim 1 wherein said reaction rate constants are defined as functions of principal components by using the statistical technique of principal component analysis and assuming an equational form for said reaction rate constants as:

$$RR_{(i)} = C_{(i)}(1 + C1_{(i)}PC_1 + \ldots + Cn_{(i)}PC_n)$$

where:

i is an index for a plurality of rate constants, $PC_1$ thru $PC_n$ are Principal Components, $C1_{(i)}$ thru $Cn_{(i)}$ are coefficients, and n is the number of principal components.

7. A method in accordance with claim 6, wherein said principal components are defined as functions selected of oil and catalyst properties assuming an equational form as:

$$PC_{(i)}=A(PROP_1)+ \ldots +B(PROP_n)$$

where:
i is an index for a plurality of principal components,
A and B are coefficients, and
$PROP_1$ through $PROP_n$ are bulk oil and catalyst properties.

8. A method in accordance with claim 7 wherein said bulk properties of oil comprise:
API gravity,
sulfur content,
basic nitrogen and
ramsbottom carbon residue; and
said bulk properties of catalyst comprise:
coke on regenerated catalyst,
metals content defined as 0.5 Ni+V, and
Davison MAT No.

9. A method in accordance with claim 8, wherein said principal components are additionally defined as a function of slurry recycle oil.

10. A method in accordance with claim 1 wherein said catalytic cracking reaction is carried out in a commercial size riser-reactor which is operated in vapor phase plug flow over a range of oil and catalyst properties.

11. Apparatus for simulating a hydrocarbon cracking reaction in which the simulation predicts results of a catalytic cracking reaction wherein a feedstream which contains a multiplicity of hydrocarbon components of complex high molecular weight molecules having various boiling ranges, is contacted with an active catalyst under catalytic cracking conditions to produce at least one hydrocarbon reaction product of a lower molecular weight, said apparatus comprising:
a catalytic cracking reactor, wherein said reactor is operated over a substantial range of oil and catalyst properties to produce said at least one reaction product of a lower molecular weight hydrocarbon, and to construct a database including operating data for cracking reactions carried out over said range of oil and catalyst properties;
a computer programmed for:
(a) storing a catalytic cracking model which defines a plurality of lumps for said multiplicity of hydrocarbons and a plurality of chemical kinetic cracking equations, wherein said lumps are defined according to boiling range into lumped species representing a reactants lump, an intermediate component lump, and at least one reaction product lump, and wherein said chemical kinetic cracking equations integrate catalyst decay with chemical kinetics;
(b) calculating reaction rate constants for said kinetic cracking equations in said computer, wherein said rate constants are determined from a plurality of bulk properties of both oil and catalyst obtained from historical operating data;
(c) calculating feed conversion and product yield according to said catalytic cracking model;
(d) displaying computer generated data for conversion of said feedstream and yield of said reaction product; and means for providing said computer with said database for simulating said cracking reaction.

12. Apparatus in accordance with claim 11, wherein said reaction rate constants are determined using the statistical technique of a principal component analysis, and wherein said database includes at least:
oil properties of fresh feed, recycle/through-put ratio, equilibrium catalyst properties, space velocity, residence time and reaction temperature for the reaction to be simulated; and
predetermined coefficients based on said actual historical operating data of said reactor for use in said principal component analysis.

13. Apparatus in accordance with claim 11, wherein said catalytic cracking reactor means comprises a riser reactor.

14. Apparatus in accordance with claim 13, wherein said plurality of properties of oil comprise:
API gravity,
sulfur content,
basic nitrogen, and
ramsbottom carbon residue, and
said plurality of properties of catalyst comprise:
coke on regenerated catalyst,
metals content defined as 0.5Ni+V and
Davison MAT No.

15. Apparatus in accordance with claim 11, wherein said reaction rate constants are defined as functions of principal components by using the statistical technique of principal component analysis and assuming an equational form as $$RR_{(i)}=C_{(i)}(1+C_{1(i)}PC_1+ \ldots +C_{n(i)}PC_n)$$

where:
i is an index for a plurality of rate constants,
$PC_1$ through $PC_n$ are principal components,
$C_{1(i)}$ through $C_{n(i)}$ are coefficients, and
n is the number of principal components.

* * * * *